United States Patent [19]

Barksby et al.

[11] Patent Number: 5,545,706

[45] Date of Patent: Aug. 13, 1996

[54] PTMEG POLYURETHANE ELASTOMERS EMPLOYING MONOFUNCTIONAL POLYETHERS

[75] Inventors: Nigel Barksby, Dunbar; Stephen D. Seneker, Sissonville, both of W. Va.

[73] Assignee: Arco Chemical Technology, L.P., Greenville, Del.

[21] Appl. No.: 437,335

[22] Filed: May 9, 1995

[51] Int. Cl.$^6$ .................................................. C08G 18/12
[52] U.S. Cl. .............................................. 528/49; 528/65
[58] Field of Search ............................... 528/49, 65, 906

[56] References Cited

U.S. PATENT DOCUMENTS

| | | | |
|---|---|---|---|
| 3,272,098 | 9/1966 | Buchholtz et al. | 528/49 |
| 3,350,361 | 10/1967 | Chandley et al. | 528/77 |
| 3,384,623 | 5/1968 | Inoue et al. | 528/49 |
| 3,425,973 | 2/1969 | Shaw, Jr. | 524/590 |
| 3,483,167 | 12/1969 | Sommer et al. | 528/49 |
| 3,761,439 | 9/1973 | Ward et al. | 528/80 |
| 3,823,111 | 7/1974 | Loew et al. | 521/61 |
| 3,875,086 | 4/1975 | Ramey et al. | 528/49 |
| 4,098,772 | 7/1978 | Bonk et al. | 528/49 |
| 4,863,994 | 9/1989 | Nelson et al. | 524/874 |
| 5,340,902 | 8/1994 | Smith et al. | 528/61 |

FOREIGN PATENT DOCUMENTS 3132760  3/1983  Germany .

OTHER PUBLICATIONS

"Comparison of the Dynamic Properties of Polyurethane Elastomers Based on Low Unsaturation Polyoxypropylene Glycols and Poly(tetramethylene oxide) Glycols", A. T. Chen, et al; Polyurethanes World Congress 1993—Oct. 10–13, 1993, pp. 388–399.

*Primary Examiner*—Rachel Johnson
*Attorney, Agent, or Firm*—Dennis M. Kozak

[57] ABSTRACT

The addition of minor quantities of a hydroxyl-functional polyoxyalkylene monol to a PTMEG-derived isocyanate-terminated prepolymer during prepolymer preparation enables the preparation of glycol extended polyurethane elastomers which exhibit improved physical properties, particularly elongation, tensile strength, and tear strength, without significantly affecting elastomer hardness.

20 Claims, No Drawings

PTMEG POLYURETHANE ELASTOMERS EMPLOYING MONOFUNCTIONAL POLYETHERS

TECHNICAL FIELD

The present invention pertains to polyurethane elastomers prepared by chain extending an isocyanate-terminated prepolymer prepared by reacting a di- or polyisocyanate with a polytetramethylene ether glycol (PTMEG). More particularly, the present invention pertains to a process of preparing PTMEG-based polyurethane elastomers with enhanced physical properties by employing a monohydroxyl-functional polyoxyalkylene polyether in the elastomer prepolymer formulation, to polyurethane prepolymers suitable for use in the subject process, and to polyurethane elastomers produced by this process.

BACKGROUND ART

Polyurethane elastomers are becoming increasingly important commercial polymer materials. Unlike many other thermoplastic and thermoset elastomers, the spectrum of raw materials used in polyurethane elastomer formulations allows the preparation of elastomers with physical properties geared to the application to an extent not possible with many other polymers. Thus, polyurethane elastomers have a myriad of diverse applications, including caulks and sealants, elastomeric fibers, viscoelastic and energy absorbing materials, and extrusion and injection moldable articles such as gears, automobile fascias, and ski boots, to name but a few.

The unique properties of polyurethane elastomers are attributable, at least in part, to the somewhat unique polyurethane polymer morphology which includes both hard and soft segments in the same polymer molecule. By adjusting the nature and relative amounts of hard and soft segments, as well as the degree of cross-linking, elastomers may be produced with hardnesses from the low Shore A range to the high Shore D range. The hard and soft segment content also influence a number of other properties such as low temperature flexibility, tensile strength, modulus, and high temperature properties such as heat sag and distortion.

Polyurethane elastomers may be prepared by a number of methods. However, the preferred method involves the preparation of a soft-segment, isocyanate-terminated polyurethane prepolymer by reacting an excess of a di- or polyisocyanate with an isocyanate-reactive component of somewhat high molecular weight, for example a molecular weight in the range of 1000 Da to 4000 Da. The higher molecular weight isocyanate-reactive components generally result in a softer elastomer with greater elongation but lower tensile strength and modulus. The resulting isocyanate-terminated prepolymer is then chain-extended with a lower molecular weight isocyanate-reactive component, generally a glycol or diamine, to form the elastomer product.

Among the most useful polyurethane elastomers are glycol extended polyurethanes containing soft-segments based on polytetramethylene ether glycol (PTMEG). PTMEG has a repeating unit containing four methylene units linked through oxygen atoms, the general formula of which may be represented as:

HO—[CH$_2$CH$_2$CH$_2$CH$_2$—O—]$_n$—H where n is such that the PTMEG has a molecular weight of from 250 to 1000, preferably from 1000 to 4000. However, PTMEG is more expensive than other soft-segment polyols such as polyoxypropylene glycols and polyester diols, and thus for PTMEG products to be competitive, they must provide improved properties with respect to the desired application. The polyurethane industry has continually sought methods to increase the performance and lower the cost of PTMEG-based polyurethane elastomers, as well as to develop competing elastomers with similar properties but at lower cost by substituting other isocyanate-reactive polymers for PTMEG in the soft segments of the polyurethane elastomer.

For example, in U.S. Pat. No. 5,340,902 and in the article by A. T. Chen et al., "Comparison of the Dynamic Properties of Polyurethane Elastomers Based on Low Unsaturation Polyoxypropylene Glycols and Poly(tetramethylene oxide) Glycols," *POLYURETHANES WORLD CONGRESS* 1993, Oct. 10–13, 1993 (pp. 388–399), it is disclosed that polyurethane elastomers prepared from polyoxypropylene diols having unsaturation in the range of 0.014–0.017 meq/g have enhanced properties as compared to PTMEG based elastomers in the same Shore hardness range.

As discussed in the latter reference, preparation of polyoxypropylene polyols by traditional base catalyzed polymerization of propylene oxide (methyloxirane) onto a suitably functional initiator molecule, for example propylene glycol or trimethylolpropane, results in a product whose unsaturation and monol content rapidly increases with increasing molecular weight. The mechanism of formation of unsaturation is still subject to question, and has been discussed, for example, in *BLOCK AND GRAFT POLYMERIZATION*, V.2, Ceresa, Ed; John Wiley & Sons, on pages 17–21. Whatever the mechanism, the result is the formation of allyloxy groups which are monofunctional and which result in the formation of polyoxypropylene monols with allylic terminal unsaturation. Since the polyoxypropylene monols are lower molecular weight, monofunctional species, their presence alters both the functionality of the finished polyol as well as the molecular weight distribution.

The unsaturation created during base catalyzed propylene oxide polymerization may be measured by titration with mercuric acetate using the protocol established by ASTM D-2849-69, "Testing Urethane Foam Polyol Raw Materials." With polyoxypropylene glycols, for example, the unsaturation increases from about 0.027 meq. unsaturation/g polyol at an equivalent weight of 600–700 to in excess of 0.09 meq/g at an equivalent weight of c.a. 2000. These levels of unsaturation correspond to c.a. 10 mol percent in low molecular weight diols, and 50 mol percent of monol in a 4000 molecular weight polyoxypropylene glycol! The average functionality, at the same time, decreases from about 1.9 to about 1.6 at these levels of unsaturation, as compared to the theoretical functionality of 2.0.

In U.S. Pat. No. 5,340,902 and the Chen et al. article previously cited, polyoxypropylene polyols were prepared using a zinc hexacyanocobaltate.glyme catalyst instead of traditional KOH catalyst. By this method of preparation, the unsaturation of a c.a. 4000 molecular weight polyoxypropylene glycol is reduced to levels in the range of 0.015 meq/g, corresponding to approximately 4 mole percent monol and an average functionality in excess of 1.9. The authors disclose that polyoxypropylene glycols having a molecular weight of 2,250 can be used to prepare chain extended elastomers in the Shore A 80 hardness range with properties similar to those prepared from 1000 molecular weight PTMEG.

Unfortunately, a direct comparison cannot be made, as the polyoxypropylene-prepared elastomers do not have identical hardnesses as their PTMEG counterparts. Differences in hardness affect many properties, most notably tensile strength, elongation, and modulus. Furthermore, to the extent they are comparable, the polyoxypropylene glycol-derived elastomers demonstrated lower split-tear strength than PTMEG products.

The ability to prepare PTMEG competitive polyoxypropylene glycol-based polyurethane elastomers utilizing low unsaturation polyols prepared by double metal cyanide glyme catalysis is premised on the low monol content of these polyols. The '902 patentees, for example, indicate that the normally relatively high monol content of conventional polyols act as chain terminators in polyurethane formation, limiting the elastomer molecular weight and downgrading physical properties. Elimination or reduction of monol content raises polyol functionality and increases elastomer molecular weight, thus increasing physical properties.

That the monol content in polyurethane elastomer formulations act as chain stoppers is further supported, for example, by U.S. Pat. No. 3,483,167, wherein a lower alkanol is added to a linear urethane prepolymer and then amine extended. The lower alkanol addition is stated to lower viscosity of the prepolymer. Similar results are reported in DE 3,132,760 A1. In U.S. Pat. No. 3,350,361, lower alkanols or monohydroxyl-functional polyethers are added to solution-borne polyurethane prepolymers prepared from polyoxyalkylene triols useful for treating leather. The monol is said to serve as chain blockers, increasing the plasticity of the crosslinked product. In U.S. Pat. No. 3,384,623, lower alkanols and monohydroxyl-functional polyesters and polyethers are added in solution to an uncatalyzed linear polyurethane prepolymer which is diamine extended to form a spandex spinning dope. The monols are stated to reduce gelling in the polymer solution after diamine addition. Neither of the latter patents provide compositions useful for cast polyurethane elastomers.

In U.S. Pat. No. 3,875,086, up to 50 weight percent hydroxyl-functional polyoxyalkylene polyether monols are added to the B-side of a one-shot polyurethane elastomer formulation containing significant amounts of polyoxyalkylene triols to control hardness and improve reactant flowability in production of flexible polyurethane foams. The elastomers prepared by the disclosed process were far softer and exhibited lower tensile and tear strengths than comparative products not containing the monols.

It would be desirable to prepare PTMEG products having enhanced properties as compared to those commercially available. It would further be desirable to lower the cost of PTMEG-based elastomers.

SUMMARY OF THE INVENTION

It has now been surprisingly discovered that the addition of minor amounts of high molecular weight polyoxyalkylene monols to PTMEG-based polyurethane prepolymers which are subsequently glycol extended to form polyurethane elastomers increases, rather than decreases, the physical properties of the elastomer products. Incorporation of the polyoxyalkylene monols in the A-side prepolymer does not appear to significantly affect hardness. Moreover, the ability to utilize relatively inexpensive polyoxyalkylene monols in the formulation results in a cost-advantage to the present formulations. This result is particularly surprising in view of the teachings of the art that monol content of polyoxypropylene diols is responsible for decreased physical properties.

DESCRIPTION OF THE PREFERRED EMBODIMENTS

The polyurethane elastomers of the present invention comprise the reaction product of a prepolymer prepared from a di- or polyisocyanate, preferably a diisocyanate or low functionality polyisocyanate, with a polyol soft segment-producing composition comprising in major part a PTMEG of number average molecular weight between 600 Da and 6000 Da, more preferably between 1000 Da and 4000 Da, and most preferably between about 1500 Da and 3000 Da, and a minor portion, i.e., between 0.5% and 10%, more preferably between 1% and 8%, and most preferably between about 2% and 5%, based on the weight of PTMEG, of a polyoxyalkylene monol, preferably a polyoxypropylene or polyoxybutylene monol; with a chain extender, preferably a low molecular weight glycol. When cross-linked elastomers are desired, a minor portion of the polyols utilized may have a nominal functionality greater than two, for example from 3 to about 8. Preferably, the polyols, with the exception of the polyoxyalkylene monol, are essentially difunctional.

By the term "polyurethane" is meant a polymer whose structure contains predominately urethane

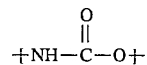

linkages between repeating units. Such linkages are formed by the addition reaction between an organic isocyanate group R—[—NCO] and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the POLYURETHANE HANDBOOK, Gunter Oertel, Ed., Hanser Publishers, Munich, ©1985, in Chapter 2, p. 7–41; and in POLYURETHANES: CHEMISTRY AND TECHNOLOGY, J. H. Saunders and K. C. Frisch, Interscience Publishers, New York, 1963, Chapter III, pp. 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalyzed. Catalysts useful are well known to those skilled in the art, and many examples may be found for example, in the POLYURETHANE HANDBOOK, Chapter 3, § 3.4.1 on pages 90–95; and in POLYURETHANE: CHEMISTRY AND TECHNOLOGY, in Chapter IV, pp. 129–217. Most commonly utilized catalysts are tertiary amines and organotin compounds, particularly dibutyltin diacetate and dibutyltin dilautrate. Combinations of catalysts are often useful also.

In the preparation of polyurethane elastomers, the isocyanate-terminated prepolymer is reacted with the active hydrogen-containing compound(s) in an isocyanate to active hydrogen ratio of from 0.7 to 1 to 2 to 1. The "index" of the composition is defined as the —NCO/active hydrogen ratio multiplied by 100. While the range described previously may be utilized, most polyurethane elastomers are prepared at indices of from 90 to about 120, more preferably from 95 to about 110, and most preferably 100 to 105. In calculating the quantity of active hydrogens present, in general all active hydrogen containing compounds other than non-dissolving solids are taken into account. Thus, the total is inclusive of polyols, chain extenders, functional plasticizers, etc.

Hydroxyl group-containing compounds (polyols) useful in the preparation of polyurethanes are described in the POLYURETHANE HANDBOOK in Chapter 3, § 3.1, pages 42–61; and in POLYURETHANES: CHEMISTRY AND TECHNOLOGY in Chapter II, §§ III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and hereric polyoxyethylene-polyoxypropylene glycols. These lists of dicarboxylic acids and polyols are illustrative only, and not limiting. An excess of polyol should be used to ensure hydroxyl termination, although carboxy groups are also reactive with isocyanates. Methods of preparation of such polyester polyols are given in the POLYURETHANE HANDBOOK and in POLYURETHANES: CHEMISTRY AND TECHNOLOGY.

Also suitable as the polyol are polymer modified polyols, in particular the so-called vinyl polymer modified polyols. Such polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing polymer polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the POLYURETHANE HANDBOOK in Chapter 3, §3.4, pages 90–109 and in POLYURETHANES: CHEMISTRY AND TECHNOLOGY, Part II, Technology.

The polyurethane elastomers of the subject invention are glycol extended, predominately linear polyurethanes having soft segments derived from an isocyanate-terminated PTMEG prepolymer and a polyoxyalkylene monol.

The polyoxytetramethylene ether glycols (PTMEG) utilized to form the soft-segment polyurethane are dihydroxyl functional polyoxytetramethylene polymers prepared in the conventional manner by polymerizing tetrahydrofuran in the presence of a suitable polymerization catalyst, for example a Lewis acid catalyst such as boron trifluoride.etherate. Other catalysts may be utilized as well, and the manner of PTMEG polymerization is not critical. Suitable PTMEGs are commercially available, for example as Terathane® 2000 PTMEG available from Du Pont Chemicals. The PTMEG should have a number average molecular weight between 600 Da and 6000 Da, preferably between 1000 and 4000 Da, and in particular, between 1500 Da and 3000 Da.

The monohydroxyl-functional polyoxyalkylene polyether should contain polyoxypropylene or polyoxybutylene residues in major part, i.e., greater than 50 weight percent based on the total weight of the polyoxyalkylene polyether monol, preferably greater than 70 weight percent, and most preferably, greater than 90 weight percent. The polyoxypropylene and polyoxybutylene residues may be derived from oxetane and tetrahydrofuran, respectively, as well as from propylene oxide and butylene oxide. The remainder of the polyoxyalkylene polyether other than the monofunctional initiator residue, may comprise other oxyalkylene moieties such as oxyethylene moieties. In the most preferred embodiment, the hydroxyl-functional polyoxyalkylene polyether monol is a homopolyoxypropylene monol.

When moieties other than those derived from propylene oxide are present in the hydroxyl-functional polyoxyalkylene monol, they may be present as a block or in random (hereric) fashion. Preferably, however, the amount of oxyethylene moieties is less than 30 weight percent, more preferably less than 20 weight percent, and most preferably less than 10 weight percent. The number average molecular weight of the hydroxyl-functional polyoxyalkylene monol should lie between 500 Da and 10,000 Da, more preferably between 1000 Da and 6000 Da, and most preferably between 1000 Da and 4000 Da. Most preferably, the molecular weight of the hydroxyl-functional polyoxyalkylene monol should approximate the molecular weight of the major PTMEG component used in preparing the soft-segment prepolymer.

The hydroxyl-functional polyoxyalkylene monol may be prepared by methods known to those skilled in the art. For example, one mole of a polyoxyalkylene diol of suitable molecular weight may be capped with one equivalent of a capping agent such as dimethylsulfate, dioctylsulfate, and the like, to produce an alkyl ether capped diol, i.e., a monol. In similar fashion, an alkyl ester capped monol may be prepared by capping a polyoxyalkylene diol with an ester forming reagent such as acetic anhydride, butyric anhydride, octanoic acid chloride, and the like. However, in such methods, additional purification steps may be required to separate the predominately mono-capped products from uncapped diol and di-capped diol. The term "hydroxyl-functional polyoxyalkylene" includes such ether and ester capped products as well as others. The important criterion is that the monol be essentially a polyoxyalkylene monohydroxyl-functional polyether polyol with only a single isocyanate reactive functionality, the single hydroxyl group. The nature of the unreactive cap is essentially unimportant since it comprises such a small portion of the total hydroxyl-functional polyoxyalkylene monol.

Thus, the preferred process of preparing the hydroxyl-functional polyoxyalkylene monol is to oxyalkylate a monohydroxyl-functional initiator compound. The initiator compound may, for example, be an aromatic, aliphatic, or cycloaliphatic monohydroxyl-functional initiator. Suitable aromatic initiators include phenol, benzyl alcohol, alkyl substituted phenols such as nonylphenol, and the like. Suitable cycloaliphatic initiators include cyclohexanol, alkyl substituted cyclohexanols, cyclopentanol, cyclohexylmethanol, and the like. Preferably, however, the initiator is an aliphatic alcohol, for example, methanol, ethanol, propanol, 1-, and 2-butanol, 2-ethylhexanol, 1-octanol, and the like. The initiator may also be an aliphatic carboxylic acid, in which case the oxyalkylation will produce an aliphatic ester capped polyoxyalkylene monol.

The oxyalkylation may be performed by an suitable method, for example by base catalysis utilizing strong bases such as sodium hydroxide, potassium hydroxide, sodium or potassium methoxide, and the like. Other suitable catalysts include diethylzinc, combinations of metal naphthenates and tertiary amines, and the like. Preferred catalysts are double metal cyanide complex catalysts such as the zinc hexacyanocobaltate.glyme catalysts disclosed in U.S. Pat. Nos. 4,843,054 and 5,158,922, and in particular, the substantially amorphous zinc hexacyanocobaltate t-butyl alcohol complex catalysts disclosed in copending U.S. patent application Serial No. 08/156,534. The use of the latter catalyst, for example, is capable of producing truly monodisperse polyoxyalkylene monols having exceptionally narrow molecular weight distributions.

In the prepolymer technique utilized in the subject invention, an isocyanate-terminated, soft-segement-containing, A-side prepolymer is prepared by reacting an excess of diisocyanate with a mixture comprising PTMEG in major portion and a polyoxyalkylene monol in minor portion, preferably less than 10 weight percent based on the weight of PTMEG, most preferably between about 1 and 6 weight percent, and most preferably between about 2 and 5 weight percent. The isocyanate may be used in the equivalent ratio (NCO/OH) of greater than 1.5 to about 20:1, more preferably 1.8:1 to 10:1, and most preferably about 2.0:1 to 6.0:1.

Many isocyanates are useful in the preparation of urethane elastomers. Examples of such isocyanates may be found in columns 8 and 9 of U.S. Pat. No. 4,690,956, herein incorporated by reference. The isocyanates preferred are the commercial isocyanates toluene diisocyanate (TDI) methylenediphenylenediisocyanate (MDI), and crude or polymeric MDI. Other isocyanates which may be useful include isophoronediisocyanate and dimethylxylylidenediisocyanate. Other isocyanates may be found in the POLYURETHANE HANDBOOK, Chapter 3, §3.2, pages 62–73 and POLYURETHANES: CHEMISTRY AND TECHNOLOGY, Chapter II, §II, pages 17–31.

Modified isocyanates are also useful. Such isocyanates are generally prepared through the reaction of a commercial isocyanate, for example TDI or MDI, with a low molecular weight diol or amine, or alkanolamine or by the reaction of the isocyanates with themselves. In the former case, isocyanates containing urethane, biuret, or urea linkages are prepared, while in the latter case isocyanates containing allophanate, carbodiimide or isocyanurate linkages are formed.

Preferred isocyanates include aryl diisocyanares such as 2,4- and 2,6-toluenediisocyanate, 2,2'-, 2,4'-, and 4,4'-diphenylmethanediisocyanates (MDI) carbodiimide modified MDI, and aliphatic and cycloaliphatic isocyanates such as 1,6-hexanediisocyanate, isophorone diisocyanate, 2,4- and 2,6-methylcyclohexyl diisocyanate, and 4,4'-dicyclohexylmethanediisocyanate and isomers thereof. When polyisocyanates are used, their functionality is preferably about 2.2 or less.

The resulting prepolymers will contain an NCO group weight percent tailored to the elastomer end use. For elastomers with large quantities of hard segments, the NCO content of the soft-segment prepolymer may advantageously be from 10% to 20%, while for softer elastomers where the percentage of hard segments is less, the NCO group content of the soft-segment prepolymer may advantageously be between 3% and 14%, preferably between 4% and 10%, and most preferably between 5% and 8%.

Adjustment of the NCO group content of the soft-segment prepolymer is within the level of skill in the art. NCO group contents in weight percent of the two most widely used isocyanates, toluene diisocyanate (TDI) and methylenediphenylene diisocyanate (MDI) are 48% and 34%, respectively. Reaction of these or other di- or polyisocyanates with any isocyanate-reactive component will progressively lower the isocyanate group content until a ratio of one equivalent of isocyanate to one equivalent of isocyanate reactive groups are present, at which time the theoretical isocyanate group content is zero. However, with a given equivalent ratio (index), the NCO group content will be inversely proportional to the molecular weight of the isocyanate reactive component. Thus, the isocyanate content of a prepolymer product obtained from a given quantity of isocyanate reacted with one mole of a 2000 molecular weight diol will be higher than that obtained from one mole of a 4000 molecular weight diol.

The prepolymers are prepared by reacting the isocyanate and isocyanate reactive component while stirring, generally under nitrogen. Solvents are not utilized, or if utilized in minor amounts, should be stripped from the prepolymer prior to glycol extension to form the elastomer. The reaction is generally conducted at elevated temperatures, for example from 40°–100° C., more preferably from 50°–80° C., and may optionally be catalyzed by traditional urethane promoting catalysts, e.g., dibutyltin dilaurate, dibutyltin diacetate, tertiary amines, phosphoric acid, and the like. The prepolymer may be advantageously degassed by application of vacuum.

The soft-segment polyurethane prepolymers are chain extended with hydroxyl-functional chain extenders of relatively low molecular weight, i.e., generally less than 300 Da. Examples of suitable hydroxyl-functional chain extenders are ethylene glycol, 1,2- and 1,3-propanediol, 1,2- and 1,4-butanediol, neopentyl glycol, 2,2,4-trimethyl-1,5-pentanediol, 1,6-hexanediol, 1,8-octanediol, 1,10-decanediol, 1,12-dodecanediol, diethylene glycol, triethylene glycol, dipropylene glycol, tripropylene glycol, the polyoxyalkylene glycols of molecular weights of up to about 300 Da; dihydroxyaromatic compounds such as hydroquinone, resorcinol, 4,4'-dihydroxybiphenyl, the various bisphenols, for example bisphenol A and bisphenol F, the various dihydroxynaphthalenes, and the various oxyalkylated dihydroxyaromatic compounds with molecular weights up to about 300 Da.

Generally, use of crosslinkers should be minimized if thermoplastic elastomers are desired, for as the degree of crosslinking increases, the melt processability rapidly decreases. Most minor amounts of crosslinkers may improve hardness, tensile strength, modulus, and compression set, while generally diminishing elongation and tear strength. Suitable crosslinkers are polyhydroxyl functional compounds such as glycerine, trimethylolpropane and their oxyalkylated oligomers, N,N,N',N'-tetrakis[2-hydroxyethyl or 2-hydroxypropyl]-ethylene diamine, the various oxyalkylated aliphatic and aromatic diamines, aminophenols, and the like, particularly triethanolamine and tripropanolamine. The foregoing list of crosslinkers is illustrative, and not limiting. Preferably, the polyurethane elastomers of the subject invention are substantially or completely devoid of crosslinkers.

The amounts of chain extenders and optional crosslinkers are chosen such that virtually complete reaction of prepolymer NCO groups is achieved when maximum polymer molecular weight is desired. Greater amounts of chain extenders over the stoichiometric amount may exert a plasticizing effect which may be desirable in some instances. Too little chain extender and/or crosslinker will produce a product containing residual NCO groups which may react with each other to form allophanate, uretdione, or isocyanurate linkages, or with moisture to form urea linkages. In any event, the polymer properties will change over time, which in most cases is undesirable. Preferably, chain extenders, and optionally crosslinkers, are used at an isocyanate index of from 95 to 105, preferably about 100.

The prepolymer, chain extender(s) and optional crosslinker(s), and optional additives such as dyes, pigments, fillers, reinforcing fibers, conductivity modifying agents, oxidation and ultraviolet light inhibitors, plasticizers, and the like, when present, may be thoroughly mixed and preferably degassed and cast or extruded, optionally but generally in the presence of suitable catalysts, to form non-cellular products. If microcellular or foamed products are desired, e.g., for applications such as jounce bumpers or shoe soles, the desired amount of reactive or non-reactive blowing agent may be added. Preferably, the elastomers are non-cellular, and are allowed to cure for 5 to 10 minutes. Full development of physical properties generally does not take place until after at least 48 hours.

Having generally described this invention, a further understanding can be obtained by reference to certain specific examples which are provided herein for purposes of illustration only and are not intended to be limiting unless otherwise specified.

EXAMPLE 1

Polyurethane Elastomer Using 1.0 Weight % Monol Based On Polyol Weight

An isocyanate-terminated prepolymer was prepared using the following formulation:

| PREPOLYMER FORMULATION | | | |
|---|---|---|---|
| MATERIALS | Equiv. Wt. | Equivalents | Weight (g) |
| 4,4'-diphenylmethane diisocyanate (MDI) | 125.0 | 0.9668 | 120.85 |
| 2000 Da polyoxytetramethylene ether glycol (hydroxyl # 55.5) | 1011 | 0.3224 | 325.68 |
| 2000 Da octanol initiated polyoxypropylene monol (hydroxyl # 27.1) | 2070 | 0.0016 | 3.29 |
| Total Prepolymer Weight | | | 449.82 |

The 2000 Da polyoxytetramethylene ether glycol (Terathane® 2000), 2000 Da octanol initiated polyoxypropylene monol, and 4,4'-diphenylmethane diisocyanate (MDI) were charged to a 1000 ml, 3-neck round-bottom flask equipped with a thermocouple, stirrer and nitrogen inlet. While stirring, the mixture was heated to 80° C. The components were reacted at 80° C. for approximately 6 hours forming an isocyanate-terminated prepolymer with a weight percent isocyanate content of 5.87 (theoretical NCO=6.00%).

The isocyanate-terminated prepolymer was degassed under vacuum (<1 mmHg for 20 minutes) and then chain extended using 1,4-butanediol at isocyanate to hydroxyl ratio (NCO/OH) of 1.05 (105 index). The prepolymer (174.55 g; 0.2440 equiv.) was added to an 8-ounce container followed by the 1,4-butanediol (10.45 g; 0.2323 equiv.) The mixture was stirred thoroughly for approximately 1 minute, then cast into closed molds preheated to 100° C. The molds were transferred to a 100° C. vented oven and cured about 16 hours. The cured elastomers were demolded and the conditioned for 4 weeks at 23° C. and 50% relative humidity prior to testing. The elastomer physical/mechanical properties are reported in Table 1.

EXAMPLE 2

Polyurethane Elastomer Using 2.0 Weight % Monol Based On Polyol Weight

An isocyanate-terminated prepolymer was prepared using the following formulation:

| PREPOLYMER FORMULATION | | | |
|---|---|---|---|
| MATERIALS | Equiv. Wt. | Equivalents | Weight (g) |
| 4,4'-diphenylmethane diisocyanate | 125.0 | 0.9653 | 120.67 |
| 2000 Da polyoxytetramethylene ether glycol (hydroxyl # 55.5) | 1011 | 0.3193 | 322.73 |
| 2000 MW octanol initiated polyoxypropylene monol (hydroxyl # 27.1) | 2070 | 0.0032 | 6.61 |
| Total Prepolymer Weight | | | 450.01 |

The 2000 Da polyoxytetramethylene ether glycol (Terathane® 2000), 2000 Da octanol initiated polyoxypropylene monol, and 4,4'-diphenylmethane diisocyanate (MDI) were charged to a 1000 ml, 3-neck round-bottom flask equipped with a thermocouple, stirrer and nitrogen inlet. While stirring, the mixture was heated to 80° C. The components were reacted at 80° C. for approximately 6 hours forming an isocyanate-terminated prepolymer with a weight percent isocyanate content of 5.87 (theoretical NCO=6.00%).

The isocyanate-terminated prepolymer was degassed under vacuum (<1 mmHg for 20 minutes) and then chain extended using 1,4-butanediol at an isocyanate to hydroxyl ratio (NCO/OH) of 1.05 (105 index). The prepolymer (174.55 g; 0.2440 equiv.) was added to an 8-ounce container followed by the 1,4-butanediol (10.45 g; 0.2323 equiv.) The mixture was stirred thoroughly for approximately 1 minute, then cast into closed molds preheated to 100° C. The molds were transferred to a 100° C. vented oven and cured about 16 hours. The cured elastomers were demolded and the conditioned for 4 weeks at 23° C. and 50% relative humidity prior to testing. The elastomer physical/mechanical properties are reported in Table 1.

EXAMPLE 3

Polyurethane Elastomer Using 4.0 Weight % Monol Based On Polyol Weight

An isocyanate-terminated prepolymer was prepared using the following formulation:

PREPOLYMER FORMULATION

| MATERIALS | Equiv. Wt. | Equivalents | Weight (g) |
|---|---|---|---|
| 4,4'-diphenylmethane diisocyanate | 125.0 | 0.9623 | 120.29 |
| 2000 Da polyoxytetramethylene glycol (hydroxyl # 55.5) | 1011 | 0.3131 | 316.48 |
| 2000 MW octanol initiated polyoxypropylene monol (hydroxyl # 27.1) | 2070 | 0.0064 | 13.23 |
| Total Prepolymer Weight | | | 450.00 |

The 2000 Da polytetramethylene glycol (Terathane® 2000), 2000 Da octanol initiated polyoxypropylene monol, and 4,4'-diphenylmethane diisocyanate (MDI) were charged to a 1000 ml, 3-neck round-bottom flask equipped with a thermocouple, stirrer and nitrogen inlet. While stirring, the mixture was heated to 80° C. The components were reacted at 80° C. for approximately 6 hours forming an isocyanate-terminated prepolymer with a weight percent isocyanate content of 5.89 (theoretical NCO=6.00%).

The isocyanate-terminated prepolymer was degassed under vacuum (<1 mmHg for 20 minutes) and then chain extended using 1,4-butanediol at an isocyanate to hydroxyl ratio (NCO/OH) of 1.05 (105 index). The prepolymer (174.51 g; 0.2440 equiv.) was added to an 8ounce container followed by the 1,4-butanediol (10.45 g; 0.2331 equiv.) The mixture was stirred thoroughly for approximately 1 minute, then cast into closed molds preheated to 100° C. The molds were transferred to a 100° C. vented oven and cured about 16 hours. The cured elastomers were demolded and the conditioned for 4 weeks at 23° C. and 50% relative humidity prior to testing. The elastomer physical/mechanical properties are reported in Table 1.

Comparative Example

Polyurethane Elastomer Without Monol

An isocyanate-terminated prepolymer was prepared using the following formulation:

PREPOLYMER FORMULATION

| MATERIALS | Equiv. Wt. | Equivalents | Weight (g) |
|---|---|---|---|
| 4,4'-diphenylmethane diisocyanate | 125.0 | 0.9683 | 121.04 |
| 2000 Da polyoxytetramethylene ether glycol (hydroxyl # 55.5) | 1011 | 0.3254 | 328.96 |
| 2000 MW octanol initiated polyoxypropylene monol (hydroxyl # 27.1) | — | — | — |
| Total Prepolymer Weight | | | 450.00 |

The 2000 Da polyoxytetramethylene ether glycol (Terathane® 2000) and 4,4'-diphenylmethane diisocyanate (MDI) were charged to a 1000 ml, 3-neck round-bottom flask equipped with a thermocouple, stirrer and nitrogen inlet. While stirring, the mixture was heated to 80° C. The components were reacted at 80° C. for approximately 6 hours forming an isocyanate-terminated prepolymer with a weight percent isocyanate content of 5.98 (theoretical NCO=6.00%).

The isocyanate-terminated prepolymer was degassed under vacuum (<1 mmHg for 20 minutes) and then chain extended using 1,4-butanediol at an isocyanate to hydroxyl ratio (NCO/OH) of 1.05 (105 index). The prepolymer (174.36 g; 0.2483 equiv.) was added to an 8-ounce container followed by the 1,4-butanediol (10.64 g; 0.2364 equiv.) The mixture was stirred thoroughly for approximately 1 minute, then cast into closed molds preheated to 100° C. The molds were transferred to a 100° C. vented oven and cured about 16 hours. The cured elastomers were demolded and the conditioned for 4 weeks at 23° C. and 50% relative humidity prior to testing. The elastomer physical/mechanical properties are reported in Table 1.

The physical/mechanical properties of the elastomers are summarized in the table below. It was found that the addition of monol to elastomers based on polytetramethylene glycol gave unexpected improvements in the % elongation, tensile strength and tear strength, while the other properties remain relatively constant. It was expected that monol would act as a chain terminator lowering the elastomer molecular weight and thus lower the elastomer physical/mechanical properties.

TABLE 1

Elastomer Physical/Mechanical Properties

| | Comparative Example | Example 1 | Example 2 | Example 3 |
|---|---|---|---|---|
| Weight % Monol | 0.0 | 1.0 | 2.0 | 4.0 |
| Shore A Hardness | 83 | 83 | 83 | 83 |
| Rebound (%) | 75 | 72 | 72 | 71 |
| Elongation (%) | 508 | 520 | 564 | 619 |
| Tensile Strength (psi) | 4520 | 4440 | 4930 | 5320 |
| 100% Modulus (psi) | 770 | 790 | 780 | 760 |
| Die C Tear Strength (pli) | 396 | 411 | 428 | 432 |

These results are especially surprising in view of the fact that all the elastomer raw materials other than the polyoxyalkylene monol are difunctional, i.e., there is no "excess" functionality over that required to produce a linear polymer. Thus, addition of even small quantities of monofunctional reactant would be expected to severely impact physical properties, which are known to be molecular weight-dependent. Further surprising is that addition of monol does not appear to significantly affect the hardness of the elastomer, in contrast to the process where monol is added to the B-side (polyol side) of one shot formulations as disclosed in U.S. Pat. No. 3,875,086 where severe decrease in hardness was observed.

Having now fully described the invention, it will be apparent to one of ordinary skill in the art that many changes and modifications can be made thereto without departing from the spirit or scope of the invention as set forth herein.

What is claimed is:

1. A polyurethane elastomer, comprising the reaction product of:

a) an isocyanate-terminated prepolymer having an NCO group content of from about 2 weight percent to about 20 weight percent, which is the reaction product of a di- or polyisocyanate having a functionality of about 2 to about 2.2; a polytetramethylene ether glycol having a molecular weight between about 600 Da and 6000 Da; and from 1 weight percent to about 10 weight percent, based on the weight of said polyoxytetramethylene ether glycol, of a hydroxyl-functional polyoxyalkylene monol containing in major part oxyalkylene moieties derived from propylene oxide, butylene oxide, and tetrahydrofuran or mixtures thereof, said polyoxyalkylene monol having a molecular weight of from about 500 Da to about 10,000 Da; and b) a glycol chain extender at an isocyanate index of from about 70 to about 130.

2. The polyurethane elastomer of claim 1 wherein said NCO group content of said prepolymer is from about 4 weight percent to about 16 weight percent.

3. The polyurethane elastomer of claim 1 wherein said NCO group content of said prepolymer is from about 4 weight percent to about 10 weight percent.

4. The polyurethane elastomer of claim 1 wherein the weight percentage of said polyoxyalkylene monol is from about 1 weight percent to about 6 weight percent.

5. The polyurethane elastomer of claim 2 wherein the weight percentage of said polyoxyalkylene monol is from about 1 weight percent to about 6 weight percent.

6. The polyurethane elastomer of claim 3 wherein the weight percentage of said polyoxyalkylene monol is from about 1 weight percent to about 6 weight percent.

7. The polyurethane elastomer of claim 1 wherein the oxyalkylene moieties of said polyoxyalkylene monol comprise minimally 90 weight percent oxypropylene moieties.

8. The polyurethane elastomer of claim 1 wherein said polyoxyalkylene monol is a $C_{1-20}$ alkanol initiated polyoxypropylene homopolymer.

9. The polyurethane elastomer of claim 8 wherein the molecular weight of said polyoxyalkylene monol is from about 1000 Da to about 4000 Da.

10. The polyurethane elastomer of claim 1 wherein said di- or polyisocyanate is a diisocyanate selected from the group consisting of 2,4- and 2,6-tolune diisocyanate; 2,4'-, 2,2'-, and 4,4'-diphenyl-methane diisocyanate; 2,4'-, 2,2'-, and 4,4'-dicyclohexylmethane diisocyanate; tetramethylxylidene diisocyanate cyanate; 1,6-hexane diisocyanate; isophorone diisocyanate, and mixtures thereof.

11. The polyurethane elastomer of claim 1 wherein said glycol chain extender is selected from the group consisting of ethylene glycol, 1,2- and 1,3-propanediol, 1,2- and 1,4-butanediol, 1,6-hexanediol, neopentyl glycol, 1,4-cyclohexanediol, 1,4-cyclohexane dimethanol, 2,2,4-trimethylpentane diol, hydroquinone, 0,0'-bis(2-hydroxyethyl)hydroquinone, 4,4'-dihydroxybiphenyl, bisphenol A, bisphenol F, and mixtures thereof.

12. The polyurethane elastomer of claim 1 wherein said glycol chain extender is selected from the group consisting of ethylene glycol, 1,4-butanediol, diethylene glycol, 1,6-hexanediol, and mixtures thereof.

13. A polyurethane elastomer having enhanced physical properties, comprising the reaction product of:

a) an isocyanate prepolymer having an group content of from about 4 weight percent to about 10 weight percent, which is the reaction product of a di- or polyisocyanate having a functionality of about 2 to about 2.2; a polytetramethylene ether glycol having a molecular weight between about 1000 Da and about 4000 Da; and from 1 weight percent to about 6 weight percent based on the weight of said polyoxytetramethylene ether glycol of a hydroxyl-functional polyoxyalkylene monol containing in major part oxyalkylene moieties derived from propylene oxide, butylene oxide, and tetrahydrofuran, said polyoxyalkylene monol having a molecular weight of from about 500 Da to about 4000 Da; and b) a glycol chain extender at an isocyanate index of from about 90 to about 110.

14. The polyurethane elastomer of claim 13 wherein said glycol chain extender comprises 1,4-butanediol.

15. A process for enhancing the physical properties of a polytetramethylene ether glycol based polyurethane elastomer prepared by the reaction of an isocyanate terminated prepolymer prepared from polytetramethylene ether glycol with a di- or polyisocyanate followed by reaction with a glycol chain extender, comprising:

preparing said prepolymer in the presence of from about 1 weight percent to about 10 weight percent, based on the weight of said polyoxytetramethylene ether glycol, of a hydroxyl-functional polyoxyalkylene monol having a molecular weight of from 500 Da to about 10,000 Da, said polyoxyalkylene monol comprising in excess of 50 weight percent of oxypropylene or oxybutylene moieties, or mixtures thereof.

16. The process of claim 15 wherein said prepolymer contains from about 4 weight percent to about 10 weight percent NCO groups, and said polyoxytetramethylene ether glycol has a molecular weight of from 1000 Da to about 6000 Da.

17. The process of claim 16 wherein said polyoxyalkylene monol is a $C_{1-20}$ alkanol initiated polyoxypropylene monol having a molecular weight from about 500 Da to about 4000 Da.

18. The process of claim 15 wherein said glycol chain extender is selected from the group consisting of ethylene glycol, 1,4-butanediol, diethylene glycol, 1,6-hexane diol, and mixtures thereof.

19. The process of claim 15 wherein said polyoxyalkylene monol is present in an amount of from about 1 to about 6 weight percent.

20. The process of claim 15 wherein said polyoxyalkylene monol is present in an amount of from about 1 to about 4 weight percent.

* * * * *